United States Patent
Izumi et al.

(10) Patent No.: US 7,283,273 B2
(45) Date of Patent: Oct. 16, 2007

(54) IMAGE COMMUNICATION APPARATUS USING IP ADDRESSES AND CONTROL METHOD THEREOF, PROGRAM, AND STORAGE MEDIUM

(75) Inventors: Michihiro Izumi, Chiba (JP); Takehiro Yoshida, Tokyo (JP); Yosuke Ezumi, Tokyo (JP); Hideo Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 719 days.

(21) Appl. No.: 10/813,006

(22) Filed: Mar. 31, 2004

(65) Prior Publication Data
US 2004/0196506 A1     Oct. 7, 2004

(30) Foreign Application Priority Data
Apr. 1, 2003    (JP) .............................. 2003-098042

(51) Int. Cl.
    *G06F 15/00*     (2006.01)
    *G03F 3/08*       (2006.01)
(52) U.S. Cl. ..................................... 358/1.15; 358/402
(58) Field of Classification Search ................ 358/1.9, 358/1.12, 1.15, 474, 402, 448, 500; 709/203, 709/220, 230, 250

See application file for complete search history.

(56) References Cited

U.S. PATENT DOCUMENTS

| | | | |
|---|---|---|---|
| 6,091,766 A | 7/2000 | Yoshida | 375/231 |
| 6,414,965 B1 | 7/2002 | Yoshida | 370/449 |
| 6,519,051 B1* | 2/2003 | Wu et al. | 358/1.15 |
| 6,539,077 B1* | 3/2003 | Ranalli et al. | 379/67.1 |
| 2001/0015969 A1 | 8/2001 | Otsuka | 370/352 |
| 2003/0076933 A1* | 4/2003 | Ranalli et al. | 379/88.17 |

FOREIGN PATENT DOCUMENTS

| | | |
|---|---|---|
| JP | 2000-066972 | 3/2000 |
| JP | 2001-211285 | 8/2001 |
| JP | 2002-368815 | 12/2002 |
| JP | 2002-060836 | 2/2003 |

OTHER PUBLICATIONS

U.S. Appl. No. 10/760,355, filed Jan. 21, 2004.

* cited by examiner

*Primary Examiner*—Gabriel I. Garcia
(74) *Attorney, Agent, or Firm*—Fitzpatrick, Cella, Harper & Scinto

(57) ABSTRACT

According to this invention, the IP address and identifier of a destination apparatus are stored in correspondence with the telephone number of the destination apparatus. Input of the telephone number of the destination apparatus is accepted. Depending on whether or not the IP address corresponding to the accepted telephone number is stored, a session request is transmitted to the destination apparatus using that IP address so as to start an image communication.

12 Claims, 12 Drawing Sheets

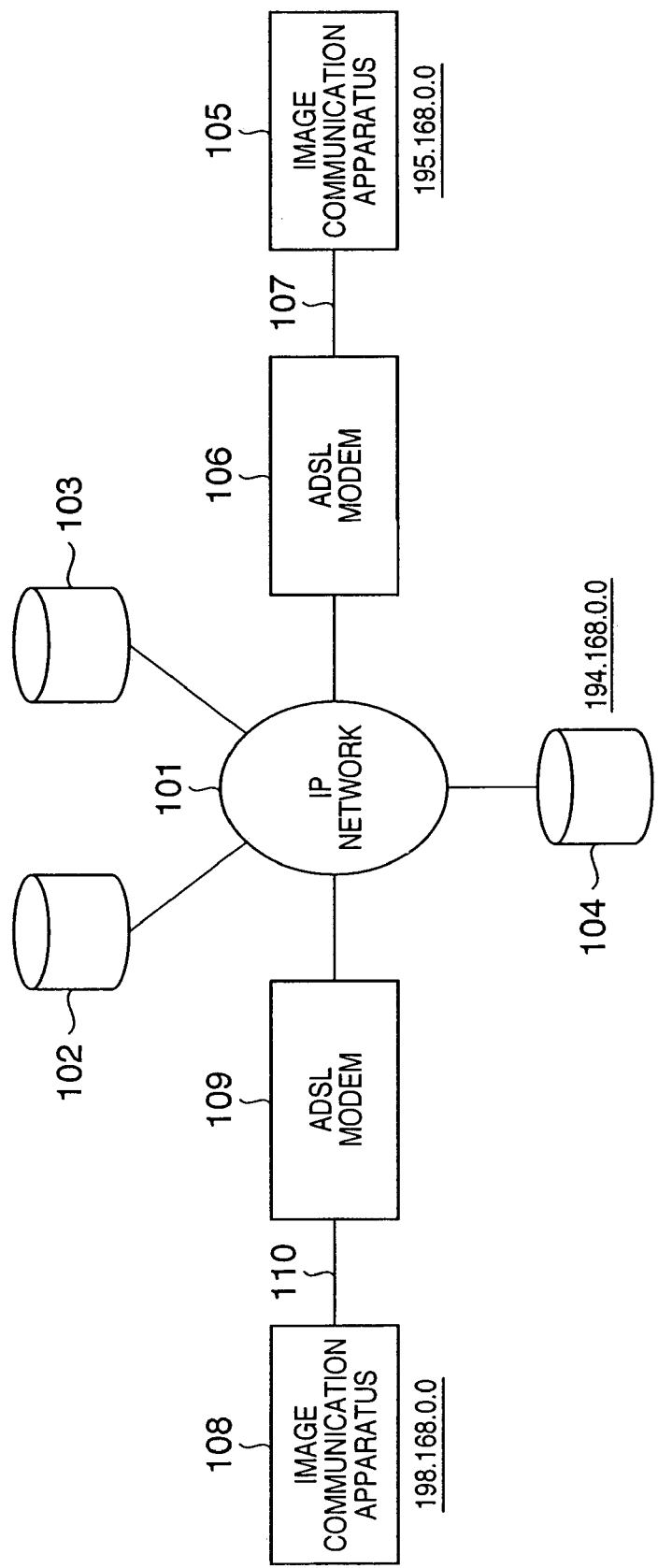

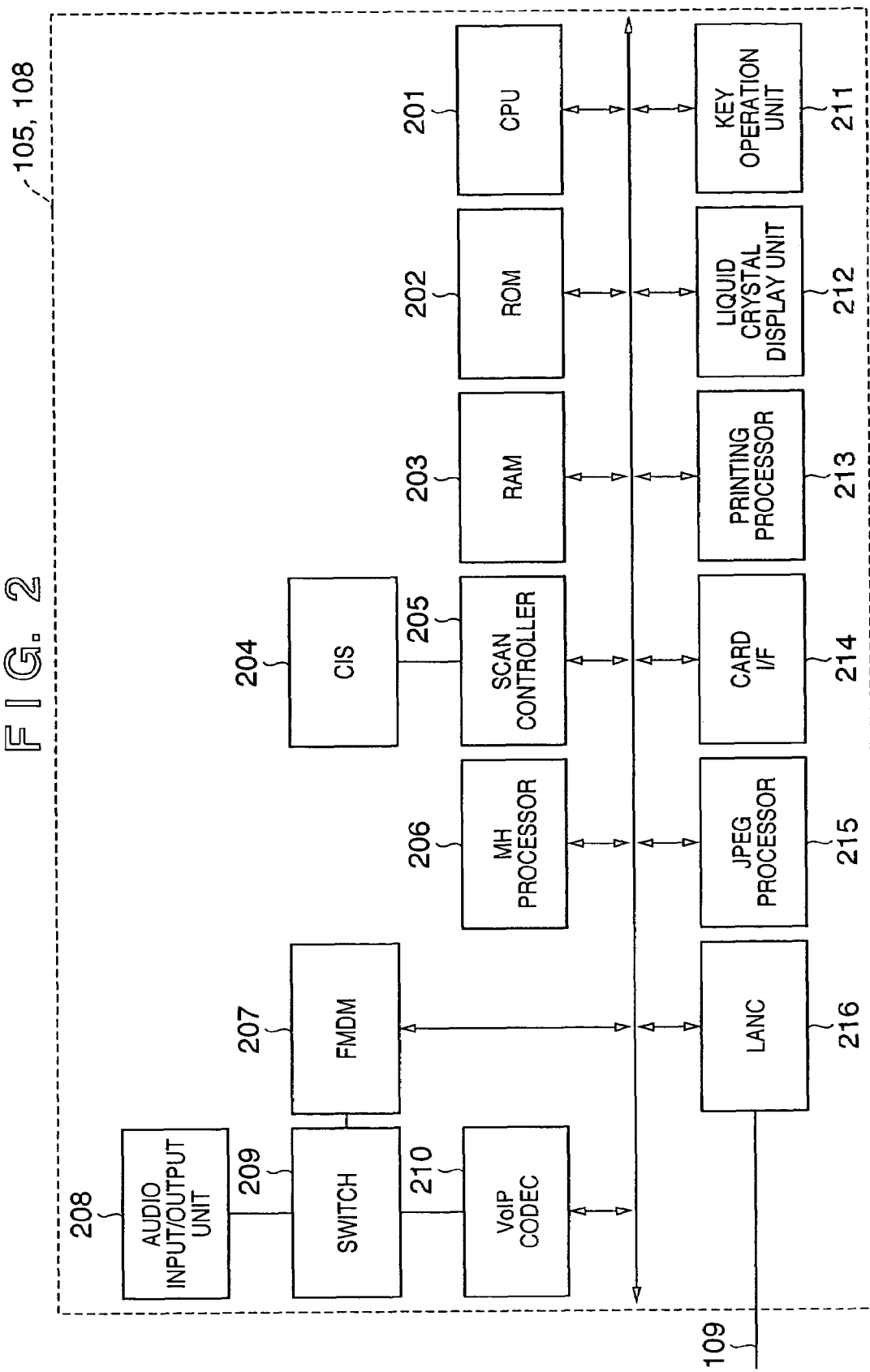

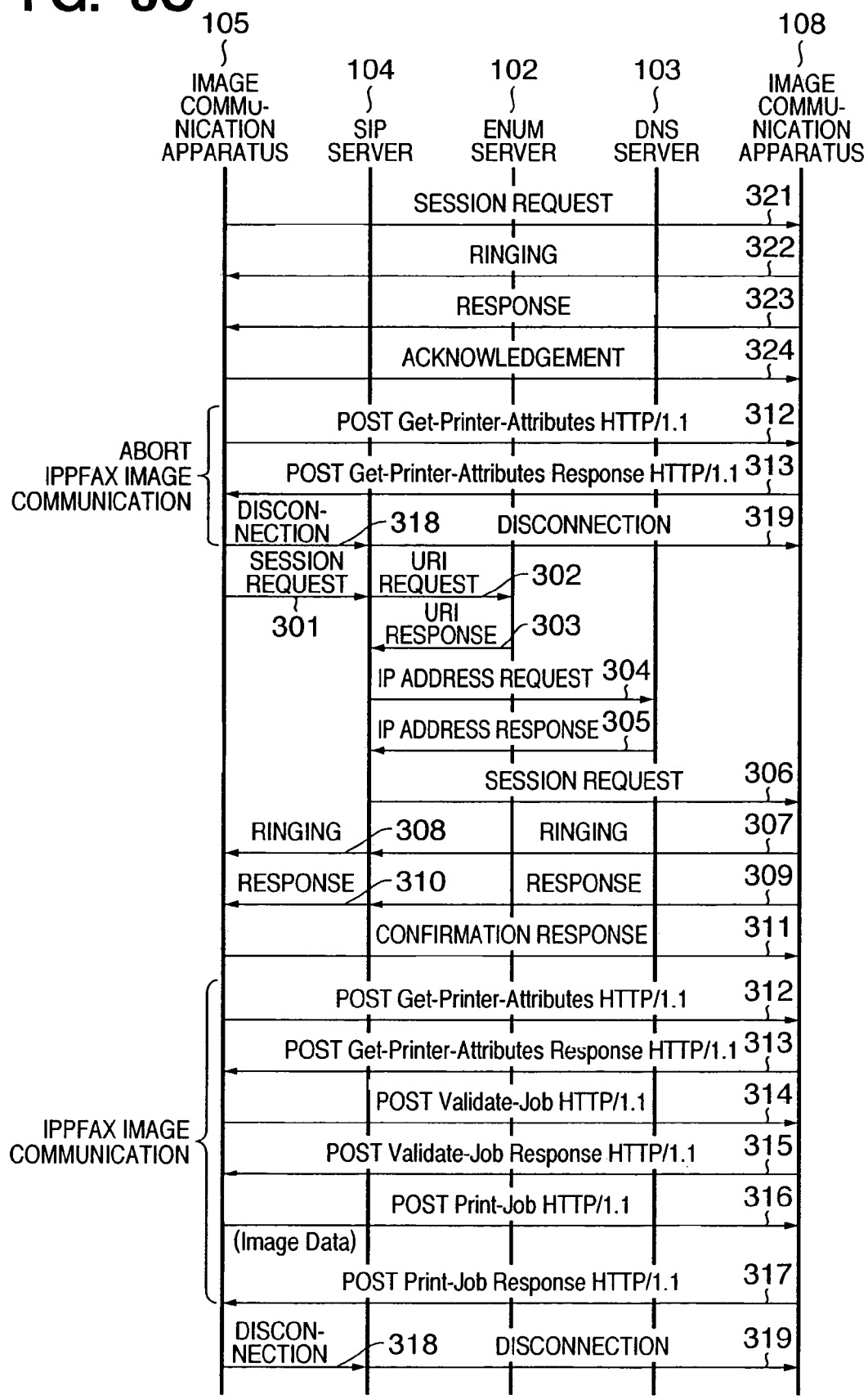

IMAGE COMMUNICATION APPARATUS USING IP ADDRESSES AND CONTROL METHOD THEREOF, PROGRAM, AND STORAGE MEDIUM

FIELD OF THE INVENTION

The present invention relates to an image communication apparatus which can establish connection to a broadband line such as ADSL or the like that can transmit a digital signal of a packet format with an IP (Internet Protocol) address and, more particularly, to an image communication apparatus which can establish connection to an IP telephone network.

BACKGROUND OF THE INVENTION

In recent years, broadband communication lines such as ADSL and the like have prevailed. An IP telephone service that packetizes and transmits audio data by utilizing a high-speed transmission feature of such broadband line has become widespread rapidly.

Against the background of such situation, a method of making high-speed image communications in real time by the same operation as a conventional facsimile system using the IP telephone network has been proposed.

In the IP telephone network, when a telephone number is input at a connected terminal, a session request message containing a destination telephone number is transmitted to an SIP (Session Initiation Protocol) server. Upon reception of the session request message, the SIP server sends an inquiry to an ENUM server to acquire an URI (Universal Resource Identifiers) as an identifier corresponding to the telephone number. Next, the SIP server acquires an IP address corresponding to the URI from a DNS (Domain Name System) server. After that, packets transmitted from the terminal are sent to a destination terminal having that IP address.

When a terminal recognizes the IP address of the partner terminal based on the IP address in a packet transmitted from the SIP server, the source terminal can transmit IP packets peer to peer to the destination terminal.

Hence, an image communication terminal requests a server to send IP address information corresponding to a destination telephone number prior to transmission of an image frame, appends the destination IP address received from the server to the image frame, segments a loaded image into a plurality of frames, appends the destination IP address to each segmented frame, and transmits the frames, thus implementing real-time high-speed image transmission.

However, in the above system, the terminal must transmit a session request message to the SIP server upon transmitting an image. For this reason, a heavy load is imposed on the SIP server.

By contrast, in one implementation method of an Internet telephone using ISDN, information indicating whether or not Internet telephone communication is allowed is stored in a memory in correspondence with telephone numbers. However, a destination IP address is acquired from an access point of the destination, and IP packets cannot be directly transmitted to the destination.

In another method, when a gateway stores IP addresses and telephone numbers in a memory in association with each other, a plurality of terminals connected to the gateway can directly exchange IP packets. However, in this case, when a terminal is connected to the gateway, its IP address and telephone number must be registered in association with each other.

In this manner, peer-to-peer communications cannot be made by designating the IP address of a partner terminal by only inputting a telephone number without any special operation, connection to the server, or the intervention of the gateway.

SUMMARY OF THE INVENTION

The present invention provides an apparatus which stores the IP address and identifier of a destination apparatus in correspondence with the telephone number of the destination apparatus, accepts input of the telephone number of the destination apparatus, and issues a session request for an image communication to the destination apparatus using the IP address based on whether or not the IP address corresponding to the accepted telephone number is stored.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing an example of the system arrangement according to embodiments of the present invention;

FIG. 2 is a block diagram showing an example of the internal arrangement of an image communication apparatus according to the embodiments of the present invention;

FIG. 3C shows an example of a communication sequence according to the second embodiment of the present invention;

DETAILED DESCRIPTION OF THE PREFERRED EMBODIMENTS

Figure 3A:
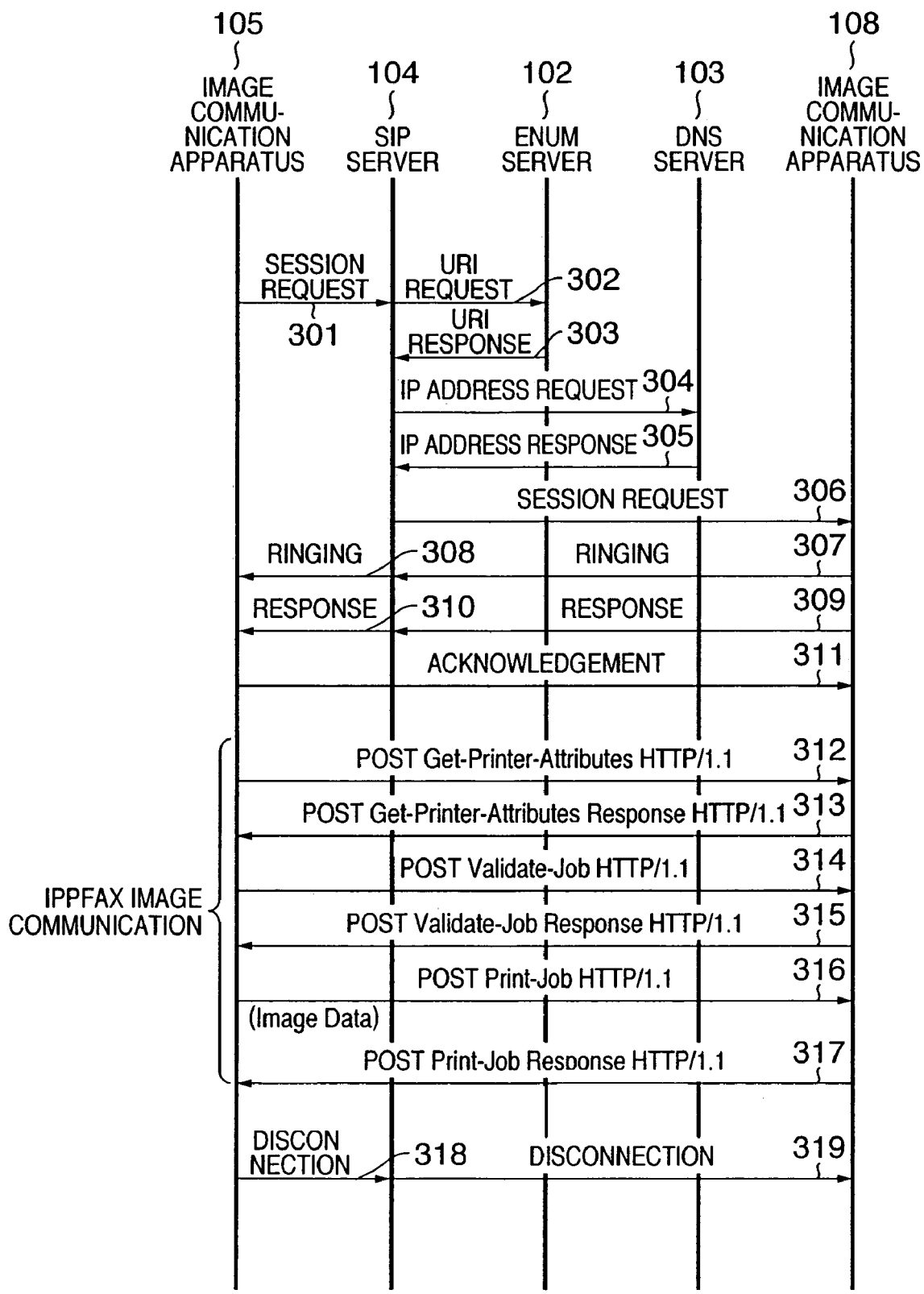
FIG. 3A shows an example of a communication sequence according to the first embodiment of the present invention.

Preferred embodiments of the present invention will now be described in detail in accordance with the accompanying drawings.

FIG. 1 shows an example of the system arrangement to which an image communication apparatus that practices the present invention is connected. Referring to FIG. 1, reference numeral 101 denotes a network, and more particularly, an Internet network (IP network). Reference numeral 102 denotes an ENUM server which is connected to the IP network 101, and executes a process for converting a telephone number into a URI. Reference numeral 103 denotes a DNS (Domain Name System) server which is connected to the IP network 101 and executes a process for converting a domain name into an IP address.

Reference numeral 104 denotes a VoIP SIP server (e.g., global IP address=193.168.0.0), which is connected to the IP network 101 and executes an SIP (Session Initiation Protocol) process required for a call connection process in an IP telephone service.

Reference numeral 105 denotes a first image communication apparatus (e.g., global IP address=194.168.0.0), which can establish connection to the IP network 101 via a modem 106. FIG. 2 shows an example of the detailed arrangement of the first image communication apparatus 105.

Reference numeral 106 denotes an ADSL modem, which incorporates an Ethernet® interface used to exchange digital data with an analog telephone interface that connects an analog telephone. Also, the modem 106 has a function of multiplexing and modulating a voice-grade signal that transmits an analog telephone interface and a non-voice-grade signal that transmits an Ethernet® interface, and transmitting the modulated multiplexed signal onto a communication line. Conversely, the modem 106 has a function of demultiplexing a signal received from a communication line into a voice-grade signal and non-voice-grade signal, and respectively outputting these signals to the analog interface and Ethernet® interface.

Reference numeral 107 denotes an Ethernet® interface which connects the ADSL modem and image communication apparatus; 108, a second image communication apparatus (e.g., global IP address=197.168.0.0) that can establish connection to the IP network 101 via a modem 109; 109, an ADSL modem; and 110, an Ethernet® interface.

FIG. 2 shows an example of the internal arrangement of the image communication apparatus according to the embodiment of the present invention. Referring to FIG. 2, reference numeral 201 denotes a CPU, which controls the image communication apparatus in accordance with programs stored in a ROM 202. The CPU 201 also executes a protocol process of TCP/IP, and assembling of image data into TCP/IP frames is done under the control of the CPU 201. Reference numeral 203 denotes a RAM, which is used as a work memory upon execution of programs, and is also used to buffer image data to be transmitted/received.

Reference numeral 204 denotes a CIS (Contact Image Sensor), which converts a document image into an analog signal. Reference numeral 205 denotes a scan controller which converts an analog signal output from the CIS into digital data. The converted digital data is transferred to the RAM 203 under the control of the CPU 201.

Reference numeral 206 denotes an MH encoding/decoding processor which compresses scanned image data by MH encoding upon image transmission. The processor 206 decodes MH-encoded image data upon reception.

Reference numeral 207 denotes a FAX modem, which modulates MH-encoded data upon transmission to convert it into a voice-grade analog signal that can be transmitted on an analog line. The FAX modem 207 demodulates a received analog signal upon reception and outputs MH-encoded data.

Reference numeral 208 denotes an audio input/output unit (handset), which comprises a microphone used to input speech, and a loudspeaker used to output speech.

Reference numeral 209 denotes an analog switch, which switches a signal to be connected to a CODEC 210. The switch 209 connects the CODEC 210 and FAX modem 207 in a facsimile image communication mode, and connects the CODEC 210 and audio input/output unit 208 in a speech communication mode.

Reference numeral 211 denotes a key operation unit, which comprises a dial, operation buttons for facsimile transmission/reception, and the like. Reference numeral 212 denotes a liquid crystal display unit.

Reference numeral 213 denotes a printing processor which converts received image data into print raster data, and executes its print process.

Reference numeral 214 denotes a card interface which can connect a memory card that stores JPEG images sensed by a digital camera.

Reference numeral 215 denotes a JPEG processor which compresses by JPEG a JPEG image input via the card interface. Also, the processor 215 decodes received JPEG image data.

Reference numeral 216 denotes a LAN controller, which exchanges data with an ADSL modem via an Ethernet® interface. When data to be transmitted is transferred to this LAN controller, the LAN controller appends a MAC (Media Access Control) frame header and FCS (Frame Check Sequence), and the like to that data, and then transmits the data to the Ethernet® interface.

With the aforementioned arrangement, detailed embodiments of the present invention will be described hereinafter.

First Embodiment

The first embodiment of the present invention will be described below with reference to FIGS. 3A to 3C, FIGS. 4A and 4B, FIG. 5, and FIG. 6. In this embodiment, by utilizing a feature that the IP address or URI of a partner terminal can be acquired upon exchanging SIP messages in an IP telephone service, the IP address or URI acquired upon transmission of the first SIP message to a specific partner is stored, and an image is transmitted without the intervention of the SIP server 104 in the second and subsequent transmission processes to that partner.

Figure 3B:
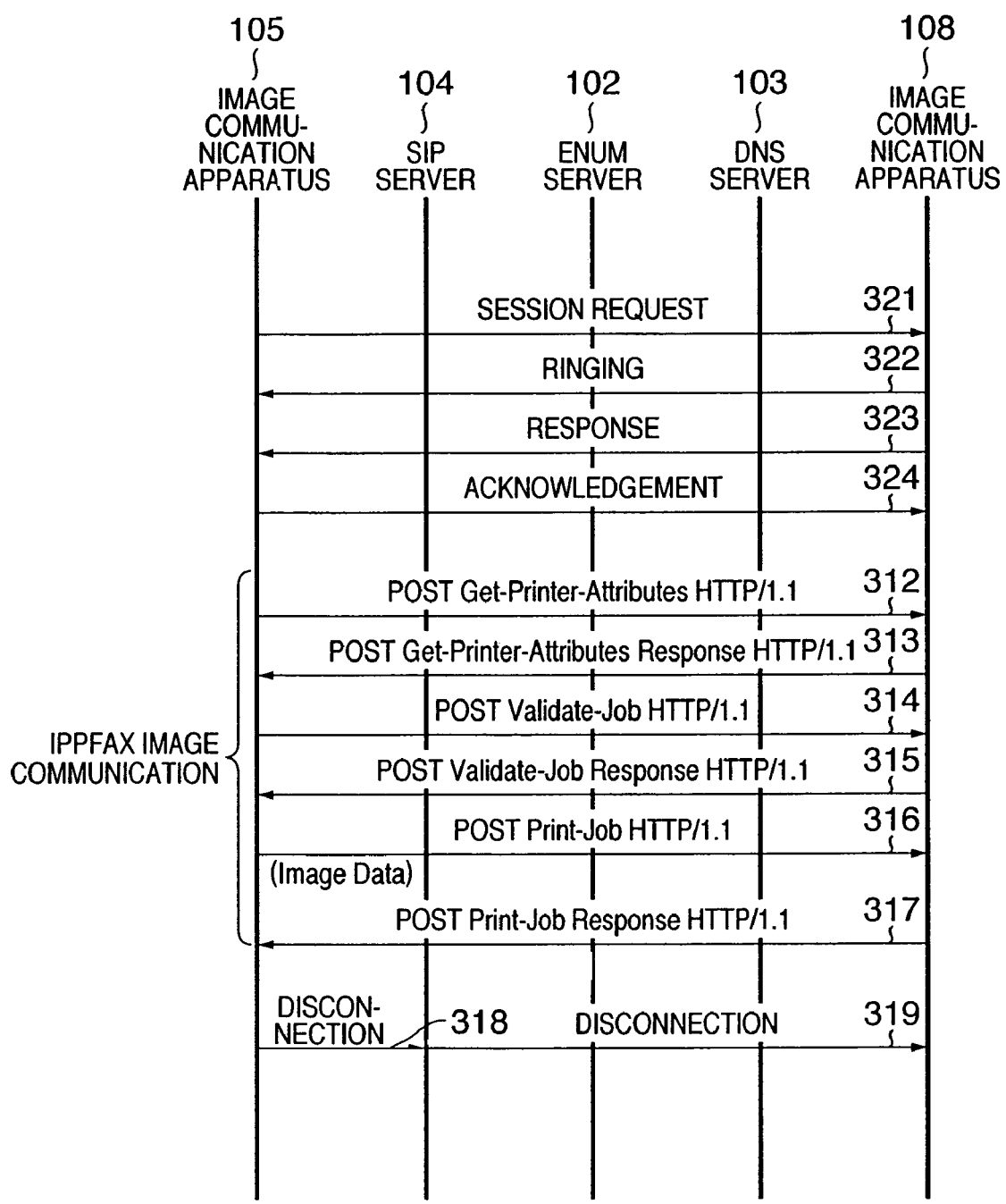
FIG. 3B shows an example of a communication sequence according to the first embodiment of the present invention.

FIG. 3A shows an example of a communication sequence when an image is transmitted from the image communication apparatus 105 to the image communication apparatus 108 for the first time. FIG. 3B shows an example of a communication sequence when an image is transmitted from the image communication apparatus 105 to the image communication apparatus 108 for the second or subsequent time, and the received Printer-URI matches that stored in a memory. FIG. 3C shows an example of a communication sequence when an image is transmitted from the image communication apparatus 105 to the image communication apparatus 108 for the second or subsequent time, and the received Printer-URI does not match that stored in a memory.

Figure 4A:
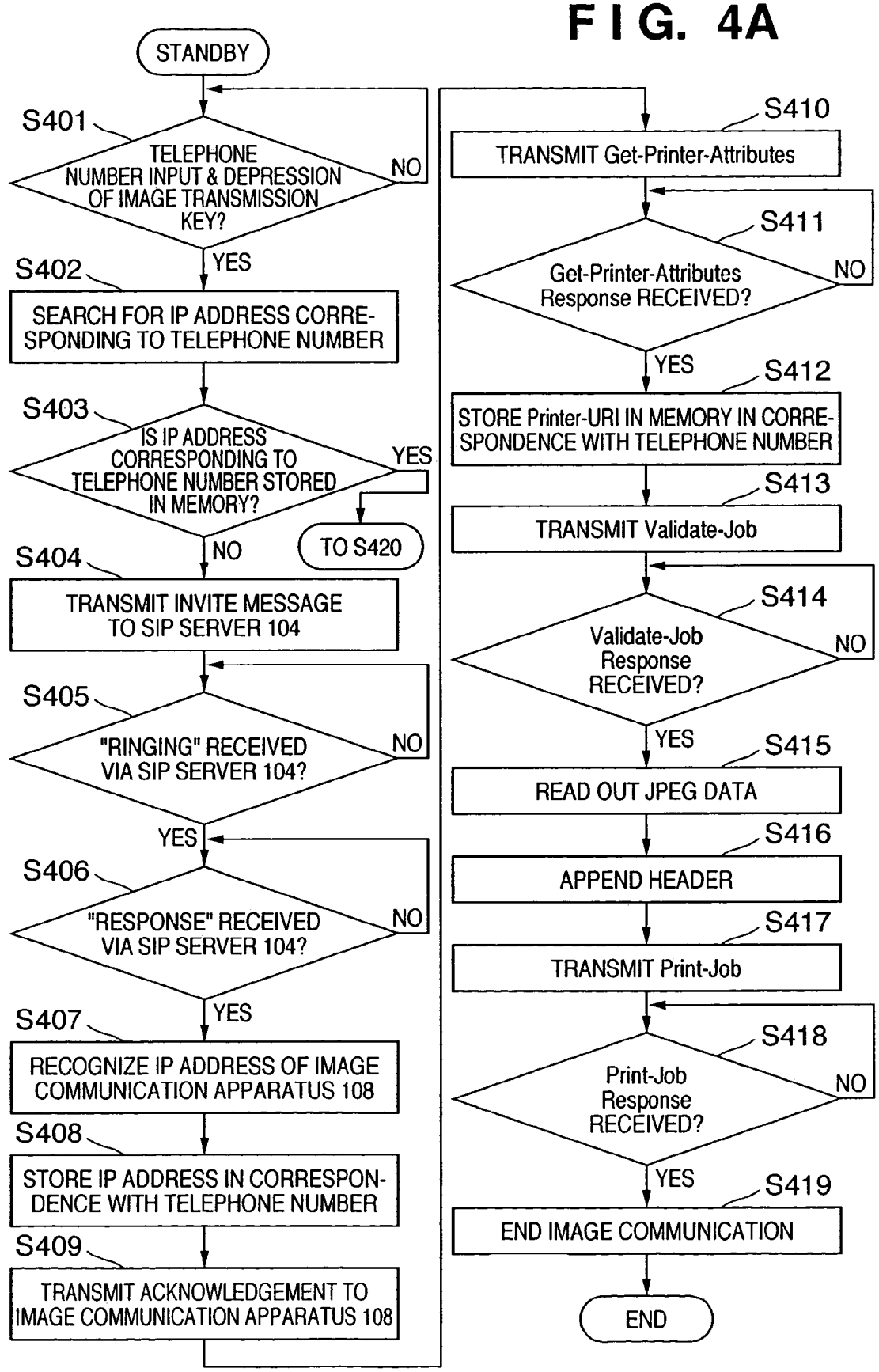
FIG. 4A is a flow chart showing an example of the process in an image communication apparatus 105 according to the embodiment of the present invention.
Figure 4B:
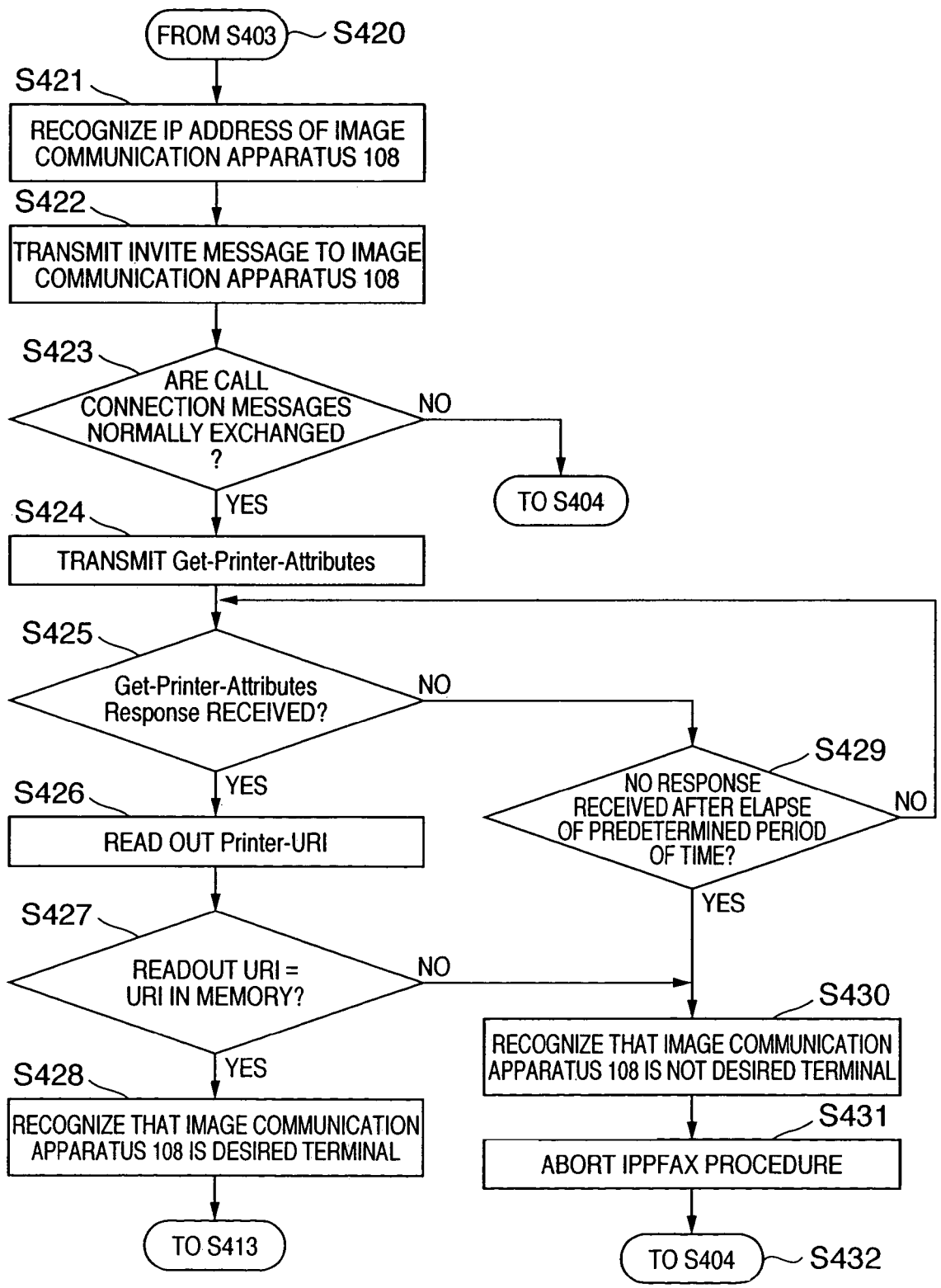
FIG. 4B is a flow chart showing an example of the process in an image communication apparatus 105 according to the embodiment of the present invention.
Figure 5:
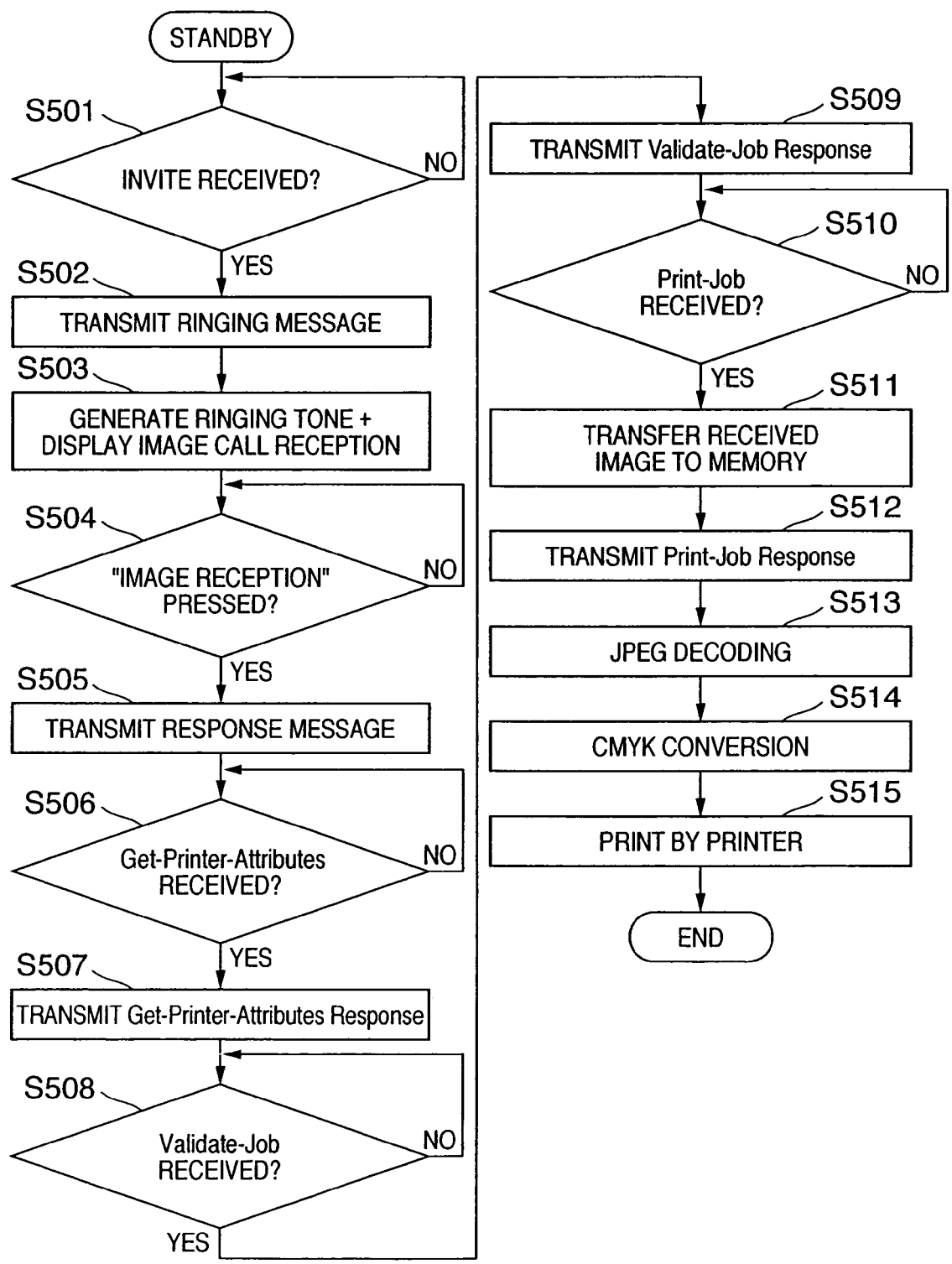
FIG. 5 is a flow chart showing an example of the process in an image communication apparatus 108 according to the embodiment of the present invention.
Figure 6:
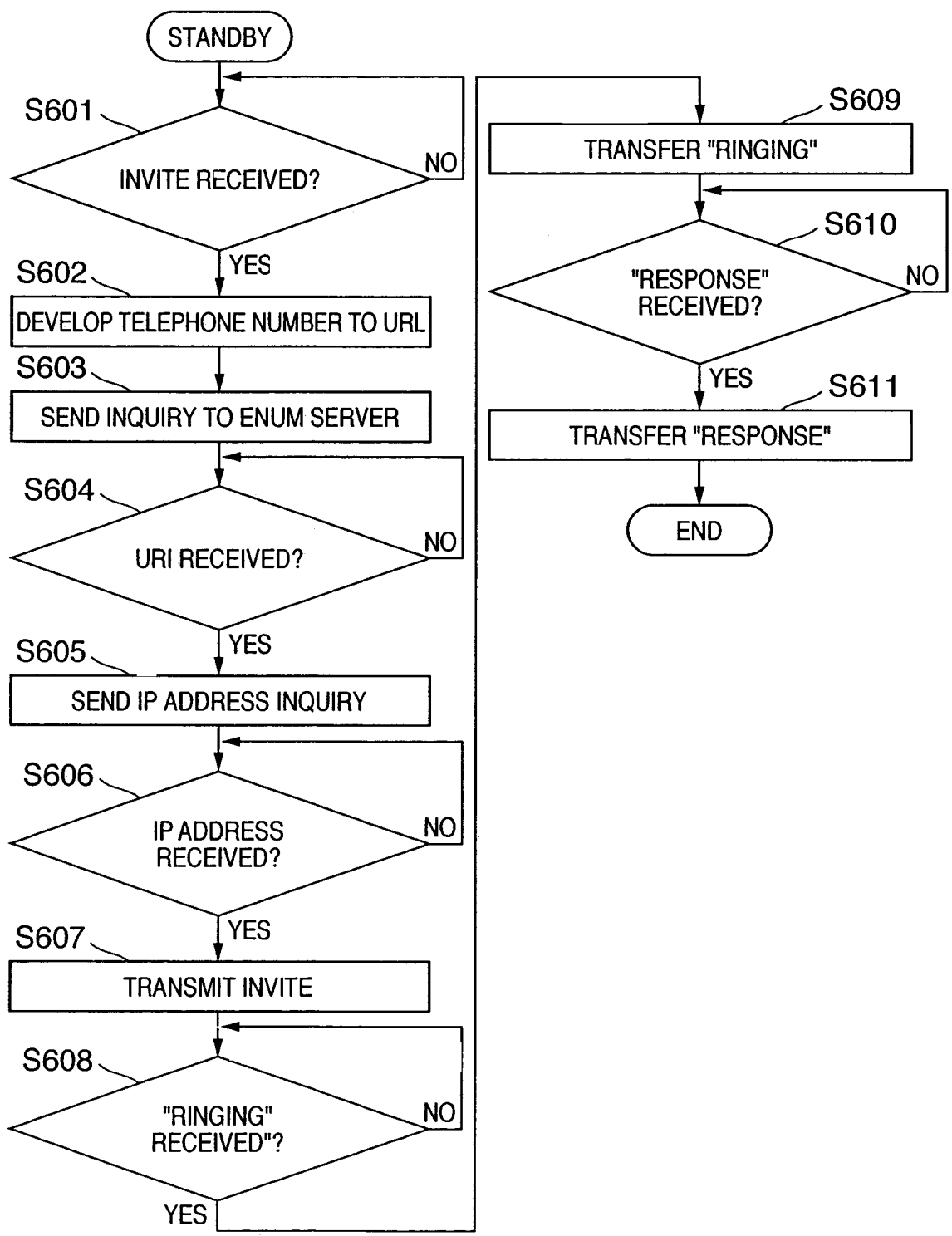
FIG. 6 is a flow chart showing an example of the process in an SIP server 104 according to the embodiment of the present invention.

Furthermore, FIGS. 4A and 4B are flow charts showing an example of the operation of the image communication apparatus 105. FIG. 5 is a flow chart showing an example of the operation of the image communication apparatus 108. FIG. 6 is a flow chart showing an example of the operation of the SIP server 104.

A process executed upon starting image transmission from the first image communication apparatus 105 to the second image communication apparatus 108 according to this embodiment will be described below.

If the user presses an image transmission key after he or she inputs a destination telephone number using the key operation unit 211 of the image communication apparatus (S401), it is checked if an IP address corresponding to this telephone number is stored in a memory (S402). If an image has already been transmitted to that destination, the IP address corresponding to the telephone number is stored in the memory. Note that a URI information search process in steps S402 and S403 corresponds to the third embodiment to be described later.

If no IP address corresponding to the input telephone number is stored in the memory (S403), a process for transmitting an SIP (Session Initiation Protocol) session request message (INVITE message) that contains the telephone number information via the Ethernet® interface 106 connected to the ADSL modem is executed (301, S404).

The SIP message has the following configuration.
INVITE sip:izumi@kamon.co.jp SIP/2.0
Via:SIP/2.0/UDP soho.kamon.co.jp
From: Michihiro Izumi<ippfax://izumi.kamon.co.jp>
To: <tel: 050-1234-5678>
Call-ID:2ef-1737483932@soho.kamon.co.jp
Cseq:1 INVITE
Content Type: application/SDP
v=0
    o=mhandley    2890844526    2890842807    IN    IP4 126.16.64.4
s=Image
t=2873397496 2873404696
m=ippfax 44000 TCP Body text, which follows a header that describes the destination information and the like based on the input telephone number, describes various parameters based on SDP (Session Description Protocol: RFC2327). Upon making an image communication, the body text includes a description about the media type=image, and the image transmission protocol type used. Also, a port number upon exchanging image packets is described. In the above example, assume that "44000" is used as a port number.

Upon transmitting this SIP message, UDP is used as the transport layer. Hence, the CPU 201 appends a UDP header to the SIP message to generate a UDP frame, and stores it in the memory 203. A destination address in the UDP header stores 193.168.0.0 as the IP address of the SIP server 104, and a source address stores 194 stores 194.168.0.0 as the IP address of the image communication apparatus 105. A destination port number stores 5060 as a Well-known port number of SIP, and a source port number stores an arbitrary port number (5000 in this embodiment).

The CPU 201 transfers the UDP frame, which is generated in this way, to the LAN controller 216. Upon reception of transmission data, the LAN controller 216 appends a MAC (Media Access Control) header to that data, and transmits the data to the ADSL modem 106, which transmits the received data onto the IP network 101. Various messages to be transmitted at subsequent timings are transmitted in the same procedure.

Since this packet stores the IP address of the SIP server as the destination IP address, it is delivered to the SIP server 104 via the IP network 101 (S601).

The SIP server 104 develops the telephone number in the header of the received session request message to a format "8.7.6.5.4.3.2.1. e164.arpa" (S602), and sends an inquiry to an ENUM server (302, S603). Upon reception of the inquiry, the ENUM server searches for an URI corresponding to 8.7.6.5.4.3.2.1. e164.arpa, and returns a URI "ippfax://kamon.co.jp/abc" to the SIP server 104 as a search result (303).

Upon reception of the URI (S604), the SIP server 104 sends an inquiry about the IP address corresponding to ippfax://kamon.co.jp/abc as the received URI to the DNS (Domain Name System) server (304, S605). Upon reception of the inquiry, the DNS server 103 searches for 198.168.0.0 as the IP address of the image communication apparatus 108 corresponding to that URI, and notifies the SIP server of that address (305).

If the SIP server 104 receives the IP address of the image communication apparatus 108 as the destination from the DNS server 103 (S606), it replaces the destination IP address in the packet received from the image communication apparatus 105 by that of the image communication apparatus 108 received from the DNS server 103, and also the source IP address by that of the SIP server 104. Then, the SIP server 104 transmits a session request message addressed to the image communication apparatus 108 (306, S607).

Upon reception of the session request message (S501), the image communication apparatus 108 transmits a ringing message to the SIP server 104 (307, S502). Upon transmitting the ringing message, a destination in the header of the ringing message stores the source telephone number information described in the header of the received session request message, and a destination IP address stores the address of the SIP server 104 as the source IP address of the session request message. Also, various parameters based on SDP are described, and a port number for image packets to be received by the image communication apparatus 108 is designated as in the session request message transmitted by the image communication apparatus 105. In this embodiment, the port number is 47000.

The image communication apparatus 108 generates a ringing tone simultaneously with transmission of the ringing message, and displays detection of image call reception (S503).

Upon reception of the ringing message (S608), the SIP server 104 forwards that message while replacing the destination IP address by the IP address of the image communication apparatus 105 and the source IP address by the IP address of the SIP server 104 (308, S609), and the image communication apparatus 105 receives the ringing message (S405).

If "image reception" is pressed on the key operation unit of the image communication apparatus 108 (S504), the image communication apparatus 108 transmits a response message to the SIP server 104 (309, S505). Note that an appending process of URI information to the response message corresponds to the third embodiment to be described later. Upon reception of the response message (S610), the SIP server 104 forwards that message by converting only the destination IP address to the IP address of the image communication apparatus 105 in turn (310, S611), and the image communication apparatus 105 receives the response message (S406). In this case, the URI of the image communication apparatus 108 may be notified together.

The image communication apparatus 105 can recognize the IP address of the image communication apparatus 108 based on the source IP address of the received response message (S407), and can directly transmit the next and subsequent packets to the image communication apparatus 108 without the intervention of the SIP server 104. The image communication apparatus 105 stores the recognized IP address "198.168.0.0" in the memory in correspondence with the telephone number "050-1234-5678" (S408). Note that a recognition & storage process of URI information in steps S407 and S408 corresponds to the third embodiment to be described later.

The image communication apparatus 105 transmits a acknowledgement message which contains the IP address of the image communication apparatus 108 as the destination IP address (311), thus ending a call establishment procedure (S409).

With the above procedure, the image communication apparatuses 105 and 108 can start exchange of image data.

In image transmission, since data error prevention is important rather than realtimeness, TCP is used as the transport layer.

Prior to image transmission, the image communication apparatus 105 transmits information such as transmission image parameters and the like to the image communication apparatus 108 on the basis of the IPPFAX protocol. All IPPFAX messages are transmitted using HTTP POST. Also, the destination port number in an IPPFAX message to be transmitted from the image communication apparatus 105 is 47100, and the source port number is 44100. Furthermore, the destination port number in IPPFAX message to be transmitted from the image communication apparatus 108 is 44100, and the source port number is 47100.

The image communication apparatus 105 transmits a Get-Printer-Attributes message (312, S410). This message aims at confirming the apparatus name, processable document format, and the like of the image communication apparatus 108. The document format is described using a MIME (Multipurpose Internet Mail Extensions) format. Since details of message text are described in RFC2911, a detailed description thereof will be omitted in this embodiment. It is important for this embodiment that the message has contents that confirms if a JPEG image is supported as the document format. Also, it is important that the message contains an attribute which confirms Printer-URI of the partner image communication apparatus 108. This is because the partner to which an image is to be transmitted is determined based on Printer-URI when an image is transmitted to the partner image communication apparatus 108 without the intervention of the SIP server.

Upon reception of the Get-Printer-Attributes message (S506), the image communication apparatus 108 transmits a Get-Printer-Attributes Response message including contents that indicate that a JPEG image is supported as the document format (313, S507).

Upon reception of the Get-Printer-Attributes Response message (S411), the image communication apparatus 105 stores Printer-URI of the image communication apparatus 108, which is described in Printer-URI in that message, in the memory in correspondence with the telephone number of the image communication apparatus 108 (S412). Also, in order to ask if image data is to be transmitted, the image communication apparatus 105 transmits a Validate-Job message to the image communication apparatus 108 (314, S413).

If the image communication apparatus 108 is ready to receive upon reception of the Validate-Job message (S508), it transmits a Validate-Job Response message to the image communication apparatus 105 (315, S509).

Upon reception of the Validate-Job Response message (S414), the image communication apparatus 105 transmits a Print-Job message so as to transmit a JPEG image file (316). That message contains the image file itself together with attribute information such as the URI of the destination apparatus, document name, document format, and the like.

Upon generating this message, the CPU 201 in the image communication apparatus 105 reads out JPEG data stored in a memory card via the card interface 214 (S415). The CPU 201 applies a BASE64 conversion process to the readout data to generate a frame appended with a TCP header that contains respective attributes of the Print-Job message, the IP address, port numbers, and the like, and stores that frame in the RAM 203 (S416). The CPU 201 transfers this frame to the LAN controller 216, which transmits the frame by appending a MAC address to it (S417).

Upon reception of the Print-Job message (S510), the image communication apparatus 108 can recognize with reference to the attribute information that the received image file is a JPEG image. In the image communication apparatus 108, the LAN controller 216 removes the header, and stores JPEG data in the RAM 203 (S511).

If the image communication apparatus 108 can normally receive image data, it transmits a Print-Job Response Message indicating normal reception to the image communication apparatus 105 (317), and ends an image communication operation (318, 319, S512). The image communication operation is to end by transmitting a disconnection message to the image communication apparatus 108 via the SIP server 104.

Upon reception of the Print-Job Response message (S418), the image communication apparatus 105 determines that it can normally transmit an image, and ends an image transmission operation (S419).

In the image communication apparatus 108 that received the JPEG image, JPEG data is decoded by the JPEG processor 215 (S513), the decoded data is converted into C, M, Y, and K, four color data by the printing processor 213 (S514), and the converted data are printed out by a printer unit (S515).

A process executed when the IP address corresponding to the telephone number is stored in the memory will be described below with reference to FIGS. 3B and 3C and FIG. 4B. In this case, if it is determined in step S402 that the IP address corresponding to the telephone number is stored in the memory (S420), the image communication apparatus 105 recognizes that the IP address of the destination image communication apparatus 108 is 198.168.0.0 (S421).

The image communication apparatus 105 appends the IP address "198.168.0.0" to a session request message, and transmits that message (321, S422). The contents of the session request message are the same as those in the above case.

After that, the image communication apparatuses 105 and 108 exchange a ringing message (322), response message (323), and acknowledgement message (324) (S423). The difference from the case wherein no IP address is stored in the memory is that these messages are directly exchanged between the image communication apparatuses 105 and 108 without the intervention of the SIP server.

After these messages are exchanged, an image processing sequence starts. The image communication apparatus 105 transmits a Get-Printer-Attributes message (312, S424). Upon reception of a Get-Printer-Attributes Response message from the image communication apparatus 108 in response to that message (313, S425), the image communication apparatus 105 reads out Printer-URI of the image communication apparatus 108, which is described in Printer-URI in that message (S426). The apparatus 105 then compares the readout Printer-URI with Printer-URI, which is stored in advance in the memory and corresponds to the dialed telephone number (S427).

If the received Printer-URI matches Printer-URI stored in the memory as a result of comparison, the image communication apparatus 105 recognizes that the image communication apparatus 108 is a desired communication partner (S428), and transmits an image by executing a procedure in step S413 and subsequent steps.

If the received Printer-URI does not match Printer-URI stored in the memory as a result of comparison, the image communication apparatus 105 recognizes that the image communication apparatus 108 is not a desired communication partner (S430), and aborts the subsequent IPPFAX procedure 319, S431).

Next, the image communication apparatus 105 transmits a session request message to the SIP server (301) in the same manner as in step S404 executed when no IP address corresponding to the telephone number is stored. The procedure in step S404 and subsequent steps is the same as that executed when no IP address corresponding to the telephone number is stored (S432).

If it is determined in step S425 that no Get-Printer-Attributes Response message (313) is not received after an elapse of a predetermined period of time (e.g., several hundred seconds) (YES in S429), the image communication apparatus 105 determines that a partner terminal to which the Get-Printer-Attributes message was transmitted is not a desired image communication apparatus 108 but it may be an apparatus which cannot return any URI information, and transmits a session request message to the SIP server in the same manner as in step S404 executed when no IP address corresponding to the telephone number is stored. The procedure in step S404 and subsequent steps is the same as that (shown in FIGS. 3A and 4A) executed when no IP address corresponding to the telephone number is stored.

Furthermore, if it is determined in step S422 that no response message is received if the INVITE message is transmitted to the image communication apparatus 108 (S423), the image communication apparatus 105 determines that the partner apparatus may be in an unconnectable state due to the presence of Firewall. In this case as well, the image communication apparatus 105 transmits a session request message to the SIP server (301) in the same manner as in step S404 executed when no IP address corresponding to the telephone number is stored. The procedure in step S404 and subsequent steps is the same as that executed when no IP address corresponding to the telephone number is stored.

As described above, when an image is to be transmitted to a partner with which an image communication has already been made at least once, the need for any communication via the SIP server can be obviated, thus decreasing the processing volume of the SIP server, and reducing the load on the SIP server. Also, the need for connection via the SIP server can be obviated, and the connection time can be shortened. Furthermore, since the IP telephone network that guarantees a predetermined transmission delay time or less is used via the SIP server, an image can be transmitted without being charged.

For a personal user of an image communication apparatus, who uses a dynamically assigned IP address since he or she cannot use a fixed global IP address, information that can specify a destination apparatus is received from the destination apparatus and is stored in a memory prior to the first image transmission. At the beginning of the second image transmission, information received from an apparatus to which an image is to be transmitted is compared with the information stored in the memory, and only when they match, an image is transmitted, thus preventing transmission errors.

In this case, the following problem can be avoided. That is, when the IP address of the destination has been changed from that of the first transmission at the time of the second image transmission, an image is transmitted to a wrong partner since it is transmitted to the IP address acquired in the first transmission. Furthermore, since Printer-URI used in the IPPFAX protocol is used as information used to specify the destination apparatus, the aforementioned effects can be achieved without adding any special procedures.

Second Embodiment

In the first embodiment, since the SIP server 104 does not replace the source IP address in the response message transmitted from the image communication apparatus 108, the image communication apparatus 105 can recognize the IP address of the image communication apparatus 108.

However, some SIP servers (IP telephone service providers) may replace all source IP addresses of packets sent from the image communication apparatus 108 to the image communication apparatus 105 by the IP address of the SIP server 104 and may transmit an SIP message by adding ippfax://kamon.co.jp/abc as the URI of the image communication apparatus 108 to that message to be transmitted to the image communication apparatus 105.

Figure 3D:
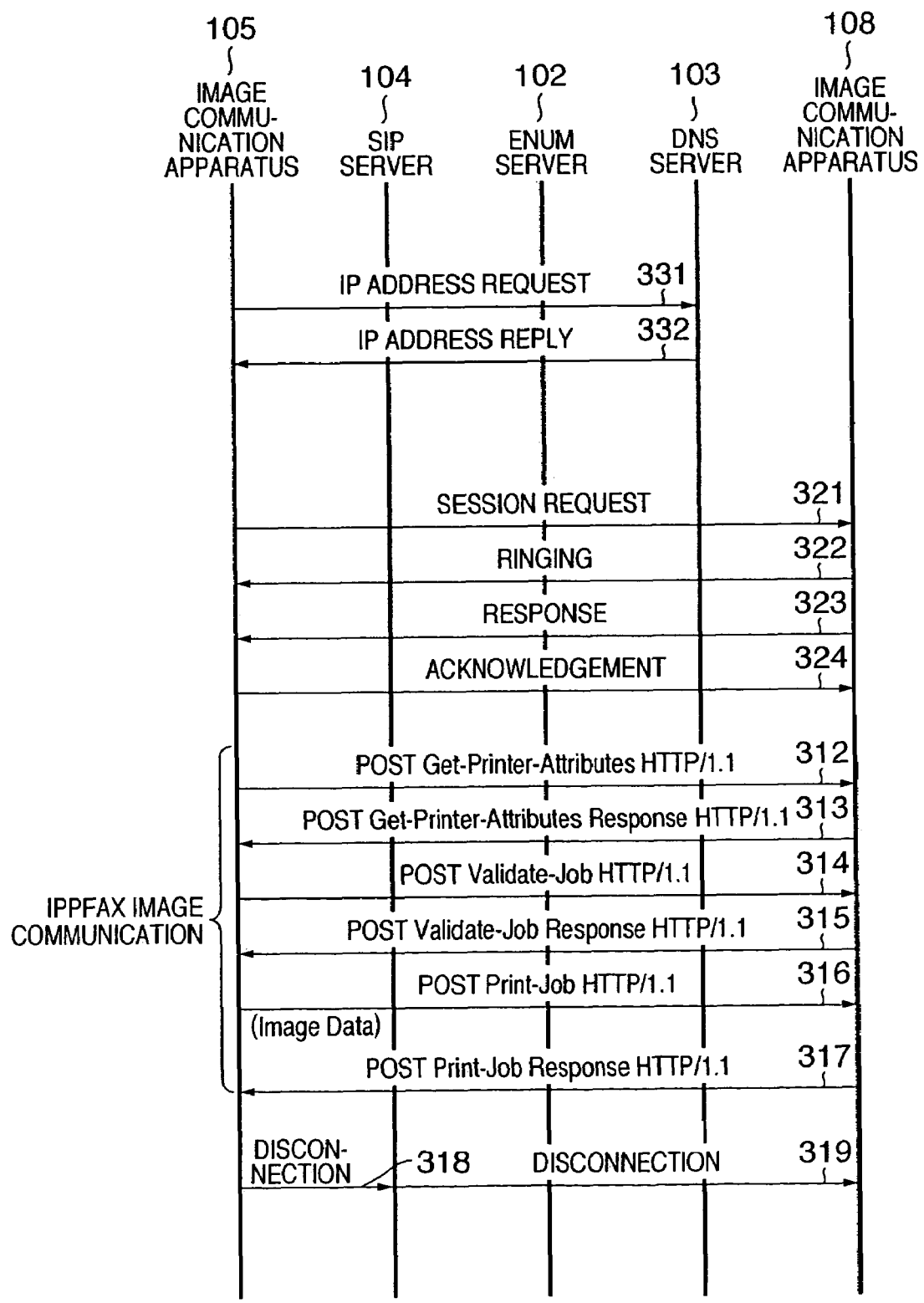
FIG. 3D shows an example of a communication sequence according to the second embodiment of the present invention.

In such case, the IP address of the image communication apparatus 108 is acquired using the URI, as shown in FIG. 3D. For this purpose, the image communication apparatus 105 stores the URI in the memory in correspondence with the telephone number of the image communication apparatus 108. When a telephone number is input, the apparatus 105 checks if the URI corresponding to that telephone number is stored in the memory.

The process executed when no URI is stored is the same as that in the first embodiment shown in FIGS. 3A and 4A.

On the other hand, if the URI is stored, the image communication apparatus 105 sends an inquiry about the IP address corresponding to the URI to the DNS server 103 prior to transmission of a session request message (331). If the DNS server 103 returns the IP address (198.168.0.0) (332), the image communication apparatus 105 transmits a session request message appended with the IP address to the image communication apparatus 108.

The subsequent process is the same as that in the first embodiment described with reference to FIG. 3B.

Third Embodiment

In the first and second embodiments, when the SIP server 104 masks the source IP addresseor URI from the SIP message of the image communication apparatus 108, an image cannot be transmitted without the intervention of the SIP server upon second and subsequent transmission processes to the same partner.

In this embodiment, the image communication apparatus 108 which received a session request from the SIP server 104 transmits a response message by adding telephone number information and URI to that message in response to the request. As a result, the image communication apparatus 105 can reliably acquire the URI of the image communication apparatus 108 independently of the specification of the SIP server 104. Hence, when the image communication apparatus 105 stores the acquired URI, it can transmit an image without the intervention of the SIP server in the second and subsequent transmission processes to the same partner.

In this embodiment, the basic process is substantially the same as that in the first embodiment, except that the URI acquired from the image communication apparatus is used in place of the source IP address provided via the SIP server 104 in respective steps to be described below.

More specifically, it is checked in step S402 in FIG. 4A if the URI corresponding to the telephone number is stored in the memory. This is because the URI corresponding to the telephone number is stored in the memory if an image has already been transmitted to that destination.

Likewise, in step S407 the image communication apparatus 105 recognizes the URI of the image communication apparatus 108 based on URI information included in the received response message. After that, the image communication apparatus 105 can directly transmit packets to the image communication apparatus 108 without the intervention of the SIP server 104. In step S408, the image communication apparatus 105 stores the recognized IP address (198.168.0.0) in the memory in correspondence with the telephone number (050-1234-5678).

Figure 3E:
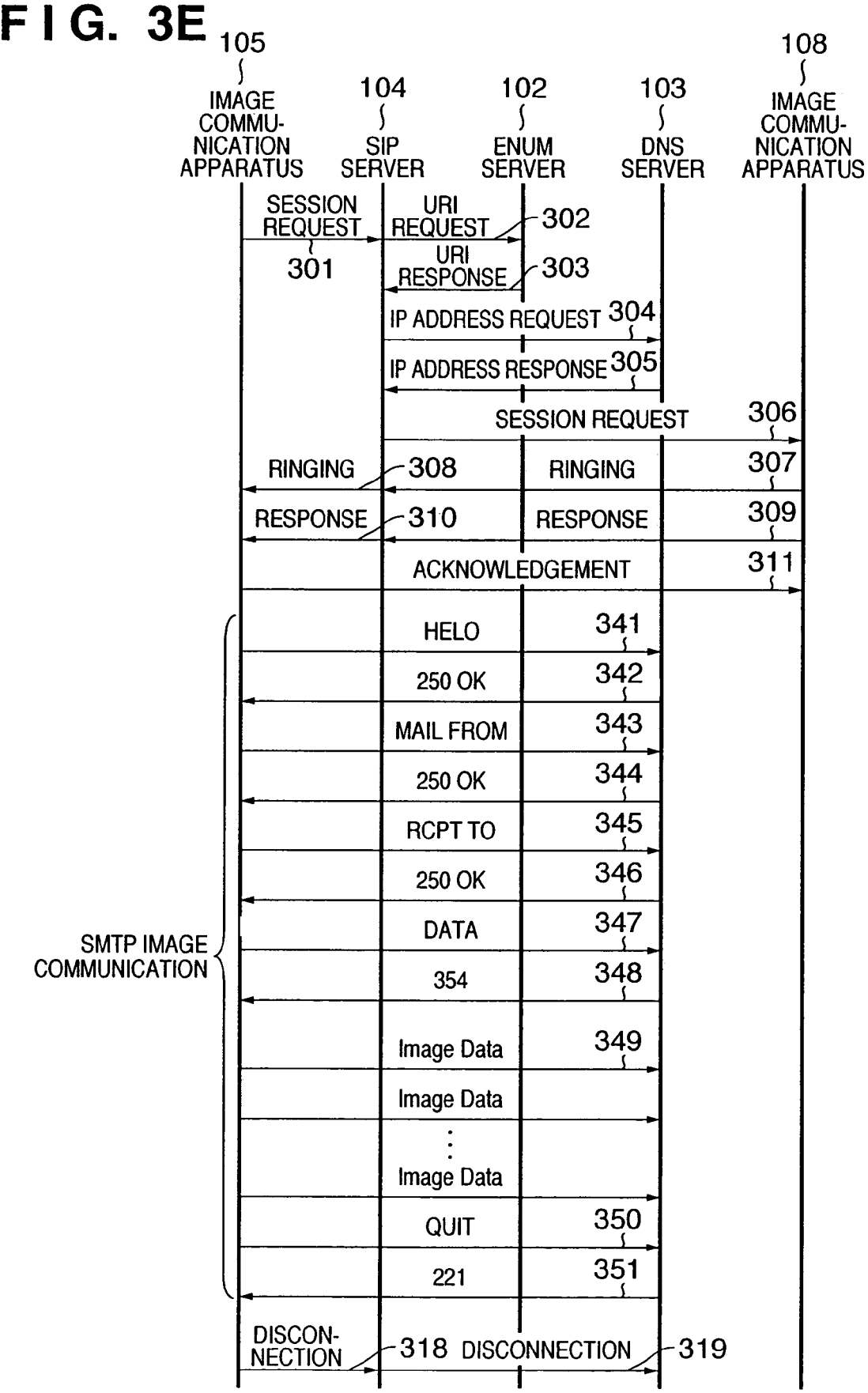
FIG. 3E shows an example of a communication sequence according to the fourth embodiment of the present invention.
Figure 3F:
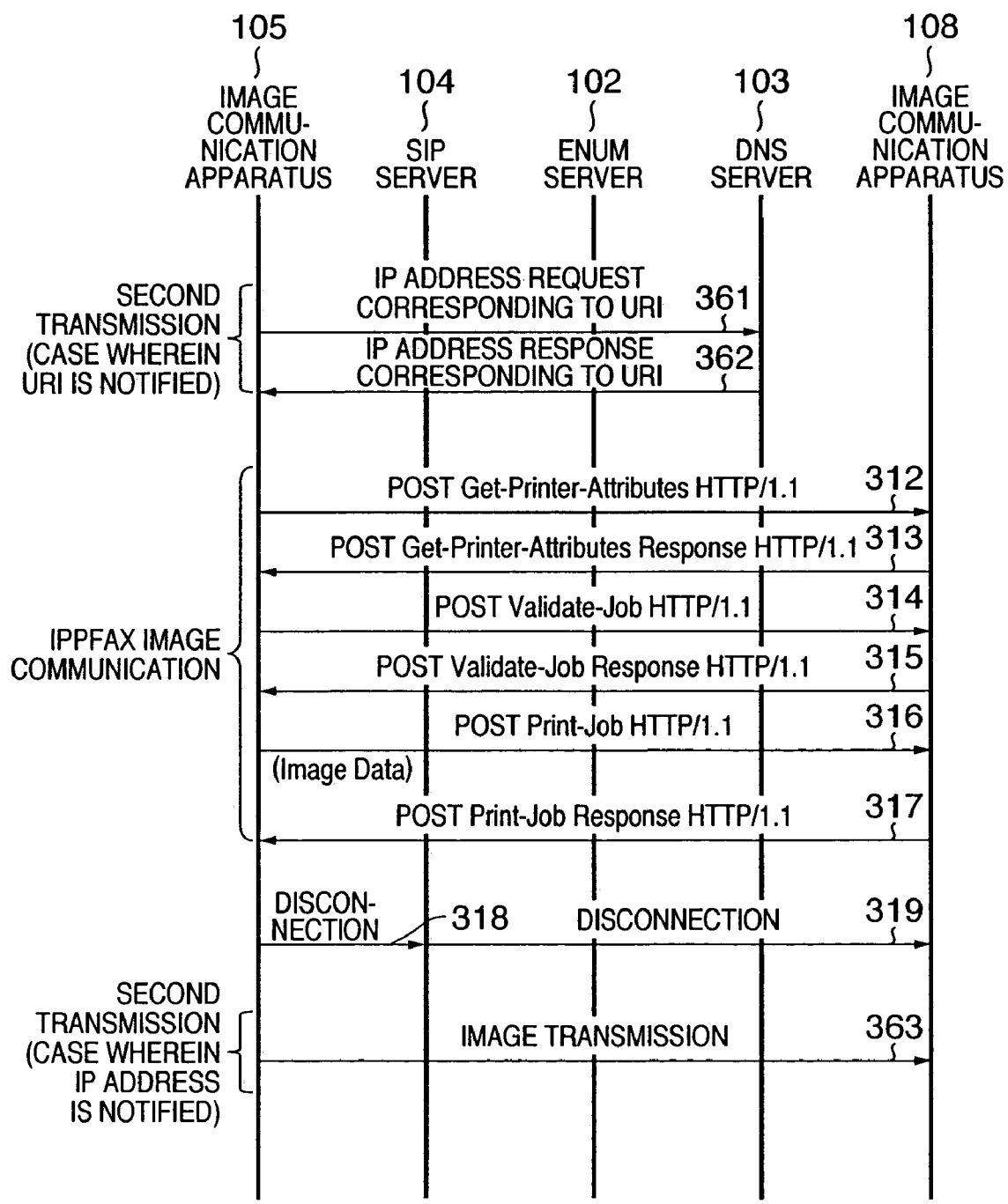
FIG. 3F shows an example of a communication sequence according to the third embodiment of the present invention.

Furthermore, if it is determined in step S402 that the URI corresponding to the telephone number is stored in the memory (S420), the image communication apparatus 105 recognizes that the IP address of the destination image communication apparatus 108 is 198.168.0.0 (S421). The image communication apparatus 105 sends an inquiry about the IP address corresponding to the URI to the DNS server 103 prior to transmission of a session request message (361 in FIG. 3F). After the DNS server 103 returns the IP address (198.168.0.0) (362 in FIG. 3F), the image communication apparatus 105 transmits a session request message appended with that IP address to the image communication apparatus 108 (S422). Note that FIG. 3F shows a communication sequence when the image communication apparatus 105 transmits an image to the image communication apparatus 108 for the second or subsequent time, and the received Printer-URI matches Printer-URI stored in the memory.

If "image reception" is pressed on the key operation unit of the image communication apparatus 108 in step S504 in FIG. 5, the image communication apparatus 108 appends its own URI information to a response message, and transmits that response message to the SIP server 104 (309, S505). Since the SIP server 104 does not change the URI information in the response message, the image communication apparatus 105 can reliably acquire the URI information of the image communication apparatus 108.

Note that when the IP address is notified in the first communication, an image can be directly transmitted to the image communication apparatus 108 using that IP address.

As described above, according to the invention corresponding to this embodiment, even when the SIP server 104 masks the source IP address or URI from the SIP message of the image communication apparatus 108, the image communication apparatus 105 can acquire URI information from the response message. Hence, the image communication apparatus can transmit an image to a partner with which an image communication has been made at least once without the intervention of the SIP server. Hence, the processing volume of the SIP server can be decreased, and the load on the SIP server can be reduced. Also, the need for connection via the SIP server can be obviated, and the connection time can be shortened. Since the second or subsequent transmission does not use the IP telephone network, an image can be transmitted without being charged.

Fourth Embodiment

In the above embodiments, when the image communication apparatus 105 transmits an image to the image communication apparatus 108, IPPFAX is used as a communication protocol. However, the same effects can be obtained using other image communication protocols or file transfer protocols.

For example, even when the SMTP (Simple Mail Transfer Protocol) is used, peer-to-peer image transmission can be implemented. FIG. 3E shows a sequence in such case.

Since the influence of differences in image communication protocol is generated only after a path between the image communication apparatuses is connected, the call origination procedure (301 to 311) is the same as that in the first embodiment.

Fifth Embodiment

In the first embodiment, the first communication corresponds to an image communication. However, even when the first communication corresponds to a voice communication, the IP address or URI can be acquired, and the same process as in the above embodiment can be executed.

Sixth Embodiment

In the above embodiments, upon transmitting an image from the image communication apparatus 105 to the image communication apparatus 108, JPEG image data in the memory card is transmitted. Alternatively, the same effects can be obtained by transmitting data formed by MH-encoding an image scanned by the CIS.

In the description of the above embodiments, detailed numerical values of the IP addresses, telephone number, and the like have been explained. However, such numerical values are merely examples to help understand the embodiments of the present invention, and the present invention is not limited to these numerical values when it is practiced.

As described above, according to the present invention, IP packets can be transmitted by designating the IP address of a partner terminal by inputting only a telephone number without any special operation or connection to a server or the like.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An image communication apparatus comprising:
   storage means for storing IP addresses and identifiers of destination apparatuses in correspondence with telephone numbers of the destination apparatuses;
   input acceptance means for accepting input of a telephone number of a destination apparatus;
   first determination means for determining whether there is an IP address to be stored in the storage means in correspondence with the accepted telephone number;
   session request transmission means for, when the first determination means determines that an IP address has been stored in correspondence with the accepted telephone number, transmitting a session request to the destination apparatus so as to start image communication using the IP address;
   session request transmission means for, when the first determination means determines that no IP address has been stored in correspondence with the accepted telephone number, transmitting a session request to a first server;
   address reception means for receiving an IP address corresponding to the accepted telephone number from the first server; and
   storage control means for storing the received IP address in the storage means in correspondence with the accepted telephone number.

2. The image communication apparatus according to claim 1, further comprising:
   identifier request means for requesting the destination apparatus to transmit an identifier after the session is established with the destination apparatus;
   identifier reception means for receiving the identifier transmitted from the destination apparatus in response to the request for the identifier;
   second determination means for determining whether an identifier that is the same as the received identifier has been stored in the storage means in correspondence with the telephone number of the destination apparatus; and
   suppression means for, when the second determination means determines that the identifier that is the same as the received identifier has not been stored in the storage means in correspondence with the telephone number of the destination apparatus, suppressing image communication to the destination apparatus.

3. The image communication apparatus according to claim 2, wherein when the identifier reception means does not receive an identifier from the destination apparatus in response to the request for the identifier after an elapse of a predetermined period of time, the suppression means suppresses image communication to the destination apparatus.

4. An image communication apparatus comprising:
   storage means for storing IP addresses and identifiers of destination apparatuses in correspondence with telephone numbers of the destination apparatuses;
   input acceptance means for accepting input of a telephone number of a destination apparatus;
   search means for searching the storage means for an identifier corresponding to the accepted telephone number;
   address request means for, when it is found as a result of search that the identifier corresponding to the accepted telephone number has been stored, requesting a second server to transmit an IP address corresponding to the identifier;
   session request transmission means for transmitting a session request to the destination apparatus so as to start image communication using the IP address obtained from the second server in response to the address request;
   session request transmission means for, when it is found as a result of search that the identifier corresponding to the accepted telephone number has not been stored, transmitting a session request to a first server;
   identifier reception means for receiving the identifier corresponding to the accepted telephone number from the first server; and
   storage control means for storing the received identifier in the storage means.

5. The image communication apparatus according to claim 4, wherein the received identifier is contained in a response transmitted from the destination apparatus in response to the session request, and the response is transmitted from the destination apparatus to the image communication apparatus via the first server.

6. A method of controlling an image communication apparatus, the method comprising:
   a step of storing IP addresses and identifiers of destination apparatuses in correspondence with telephone numbers of the destination apparatuses;
   an input acceptance step of accepting input of a telephone number of a destination apparatus;
   a first determination step of determining whether an IP address corresponding to the accepted telephone number has been stored in the storage step;
   a session request transmission step of transmitting, when it is determined in the first determination step that the IP address corresponding to the accepted telephone number has been stored, a session request to the destination apparatus so as to start image communication using the IP address;
   a session request transmission step of transmitting, when it is determined in the first determination step that the IP address corresponding to the accepted telephone number has not been stored, a session request to a first server; and
   an address reception step of receiving the IP address corresponding to the accepted telephone number from the first server, wherein in the storage step, the received IP address is stored in correspondence with the accepted telephone number.

7. The method of controlling an image communication apparatus according to claim 6, further comprising:
   an identifier request step of requesting the destination apparatus to transmit an identifier after the session is established with the destination apparatus;
   an identifier reception step of receiving the identifier transmitted from the destination apparatus in response to the request for the identifier;
   a second determination step of determining whether an identifier that is the same as the received identifier has been stored in correspondence with the telephone number of the destination apparatus in the storage step; and
   a suppression step of suppressing, when it is determined in the second determination step that the identifier that is the same as the received identifier has not been stored in correspondence with the telephone number of the destination apparatus, image communication to the destination apparatus.

8. The method of controlling an image communication apparatus according to claim 7, wherein when an identifier is not received in the identifier reception step from the destination apparatus in response to the request for the identifier after an elapse of a predetermined period of time, the suppression step suppresses image communication to the destination apparatus.

9. A method of controlling an image communication apparatus, the method comprising:
   a storage step of storing IP addresses and identifiers of destination apparatuses in correspondence with telephone numbers of the destination apparatuses;
   an input acceptance step of accepting input of a telephone number of a destination apparatus;
   a determination step of determining whether an identifier corresponding to the accepted telephone number has been stored in the storage step;
   an address request step of requesting, when it is determined that the identifier corresponding to the accepted telephone number has been stored, a second server to transmit an IP address corresponding to the identifier;
   a session request transmission step of transmitting a session request to the destination apparatus so as to start image communication using the IP address obtained from the second server in response to the address request;
   a session request transmission step of transmitting, when it is determined that the identifier corresponding to the accepted telephone number has not been stored, a session request to a first server; and
   an identifier reception step of receiving the identifier corresponding to the accepted telephone number from the first server, wherein in the storage step, the received identifier is stored.

10. The method of controlling an image communication apparatus according to claim 9, wherein the received identifier is contained in a response transmitted from the destination apparatus in response to the session request, and the response is transmitted from the destination apparatus to the image communication apparatus via the first server.

11. A control program, stored on a computer readable medium, the program for an image communication apparatus to allow a computer to execute the method of controlling an image communication apparatus according to any one of claims 6 through 10.

12. A computer readable storage medium, on which is stored a control program of an image communication apparatus, the program for allowing a computer to execute the method of controlling an image communication apparatus according to any one of claims 6 to 10.

* * * * *

UNITED STATES PATENT AND TRADEMARK OFFICE
CERTIFICATE OF CORRECTION

| | |
|---|---|
| PATENT NO. | : 7,283,273 B2 |
| APPLICATION NO. | : 10/813006 |
| DATED | : October 16, 2007 |
| INVENTOR(S) | : Izumi et al. |

It is certified that error appears in the above-identified patent and that said Letters Patent is hereby corrected as shown below:

SHEET 3:
FIG. 3A, in Reference Numeral 318, "DISCON" should read -- DISCON- --.

SHEET 5:
FIG. 3C, in Reference Numeral 105, "COMMu-" should read -- COMMU- --.

SHEET 12:
FIG. 6, S608, "RECEIVED"?" should read -- RECEIVED?" --.

COLUMN 1:
Line 43, "peer to peer" should read -- peer-to-peer --.

COLUMN 5:
Line 53, "stores 194" should be deleted.

COLUMN 7:
Line 11, "transmits a" should read -- transmits an --.

COLUMN 9:
Line 17, "319,S431)." should read -- (319,S431). --; and
Line 26, "is not" should read -- is --.

COLUMN 10:
Line 56, "addressor" should read -- address or --.

UNITED STATES PATENT AND TRADEMARK OFFICE
CERTIFICATE OF CORRECTION

PATENT NO. : 7,283,273 B2
APPLICATION NO. : 10/813006
DATED : October 16, 2007
INVENTOR(S) : Izumi et al.

It is certified that error appears in the above-identified patent and that said Letters Patent is hereby corrected as shown below:

COLUMN 12:
Line 53, "system" should read -- a system --.

Signed and Sealed this

Tenth Day of June, 2008

JON W. DUDAS
*Director of the United States Patent and Trademark Office*